United States Patent Office 3,256,299
Patented June 14, 1966

3,256,299
4,7-METHANO ISOBENZOFURANS AND ISOBENZOTHIOPHENES
Victor Mark, Olivette, Mo., assignor to Monsanto Company, a corporation of Delaware
No Drawing. Filed Nov. 13, 1962, Ser. No. 237,338
10 Claims. (Cl. 260—332.5)

This invention relates to novel structures and procedures for their preparation. More specifically, the invention relates to pesticides, especially insecticides, having unusual and interesting properties prepared by the halogenation of Diels-Alder adducts of alkylated halocyclopentadiene and a cyclic olefin.

Diels-Alder adducts of hexachlorocyclopentadienes are known to be toxic not only to insects but also to domestic animals, desirable wild life and to humans. By the substitution of organic radicals, especially alkyl groups, on the allylic carbon atoms of the hexachlorocyclopentadiene molecule, reduction in toxicity of the adducts to the warm blooded animals occurs without serious reduction in microbiological activity. This advantageous reduction of the toxicity hazards is the fundamental objective of this invention, and this modification of the spectrum of activity is a significant step in the development of biological toxicants.

In application Serial No. 132,570, filed August 21, 1961, there are described and claimed Diels-Alder adduction procedures and novel compounds prepared by these methods. Certain of these adducts are used in the practice of this invention whereby new compounds with increased activity are prepared. Specifically, the new procedure involves the halogenation of the adducts to form compounds which cannot be prepared by the adduction of the diene with dienophiles having the desired halogen substituents.

The new biological toxicants have the structure

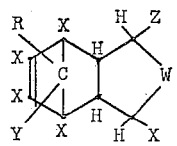

wherein X is selected from the class consisting of chlorine and bromine; wherein R is selected from the class consisting of hydrocarbon radicals of the group consisting of alkyl having up to 12 carbon atoms, alkenyl having up to 12 carbon atoms, alkynyl having up to 12 carbon atoms, and cycloalkyl radicals having from three to seven carbon atoms; and the said hydrocarbon radicals having substituents of the class consisting of alkyloxy, alkylthio, chlorine, bromine and phenyl, the alkyl moiety of said substituents having up to four carbon atoms; wherein Y is selected from the class consisting of R, X and hydrogen; wherein Z is selected from the group consisting of X and hydrogen; and wherein W is selected from the class consisting of oxygen and sulfur.

These products are prepared by the halogenation of adducts of dihydrofuran or dihydrothiophene and dienes such as:

1,2,3,4,5-pentachloro-5-methylcyclopentadiene
5-allyl-1,2,3,4,5-pentabromocyclopentadiene
1,2,3,4,5 - pentachloro- 5- (3-methoxypropyl)cyclopentadiene
1,2,3,4,5-pentabromo-5(2-chloroethyl)cyclopentadiene
1,2,3,4-tetrachloro-5,5-diethylcyclopentadiene
1,2,3,4,5-pentachloro-5-n-decylcyclopentadiene
1,2,3,4,5-pentachloro-5-dodecynylcyclopentadiene
1,2,3,4-tetrabromo-5-cyclohexylcyclopentadiene
5-benzyl-5-bromo-1,2,3,4-tetrachlorocyclopentadiene
5(2-n-butylthiopropyl) - 1,2,3,4,5 - pentachlorocyclopentadiene
5(2-ethylhexyl)-1,2,3,4,-tetrabromocyclopentadiene
5,5-dibenzyl-1,2,3,4-tetrachlorocyclopentadiene In accordance with this invention it has been found that the new active compounds, which cannot be advantageously prepared by direct adduction of the halocyclopentadiene with the halodihydrofuran or the halodihydro thiophene, can be made by the halogenation of adducts of the halocyclopentadiene and either dihydrofuran or dihydrothiophene. In accordance with the invention, the said adducts are treated with chlorine or bromine under specific conditions whereby the new class of compounds are formed.

At temperatures of from 150° C. to 300° C. or higher the replacement of hyrogen by the halogen with the evolution of hydrogen chloride can be accomplished. It is, however, possible to carry out the reaction at much lower temperatures in the presence of a suitable catalyst, which is capable of activating the halogen. The best catalysts are those which cause a homolytic activation of the halogen molecule, for example actinic irradiation, ultraviolet light, X-rays and gamma rays. Peroxide catalysts, such as benzoylperoxide, di-t-butyl peroxide and t-butylperbenzoate are also useful. By simple irradiation of the reactants with light, and especially ultraviolet light, the reaction between the halogen and the Diels-Alder adduct will even take place at or below room temperatures, but optimum conditions usually involve temperatures between 50° C. and 150° C. The reaction will also proceed in the presence of peroxide catalysts under conditions which induce the formation of free radicals. The activation of the halogen may also be effected by means of catalysts of the Lewis acid type, such as $AlCl_3$, $FeCl_3$, $BF_3$ and $AlBr_3$. In general, any condition or combination of conditions which induce the evolution of hydrogen halide are suitable.

Further details of the process for preparing the new compounds are set forth in the following examples.

*Example 1*

A 23.6 gram sample of a Diels-Alder adduct of 1,2,3,4,5-pentachloro-5-ethylcyclopentadiene and dihydrofuran was dissolved in 350 ml. of carbon tetrachloride and charged to a flask containing a suitable gas inlet tube. Gaseous chlorine was introduced while irradiating the mixture with an ultraviolet lamp until 10.9 grams of chlorine had been absorbed. The reaction mixture was maintained during this operation at a temperature of 30 to 50° C. The product was recovered by evaporating the carbontetrachloride and was found to have an index of refraction, $n_{25}^D$ 1.5498 and the structure

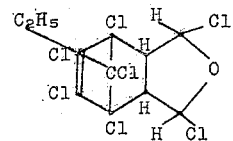

This compound was found to be very active in the control of mosquito larvae; 0.16 part per million provided a 100% kill and 0.078 part per million provided a 90% kill.

*Example 2*

The preceding example was repeated except that the adduct of dihydrofuran and 1,2,3,4,5-pentachloro-5-methylcyclopentadiene was used in place of 5-ethyl derivative. The resulting product (M.P. 100-102° C.) was produced in a 97% yield. It was found by spectra and elemental analyses to have the structure

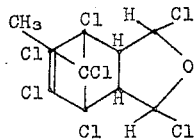

This compound was found to be very good in the control of mosquito larvae, 100% kill being effected by 0.078 part per million whereas 0.039 part per million provided a 80% kill.

*Example 3*

The procedure of Example 1 was repeated except using the adduct of 1,2,3,4,5-pentachloro-5-(2-ethylhexyl)cyclopentadiene and dihydrofuran. The product, $n_{25}^D$ 1.5390 was found to have the structure

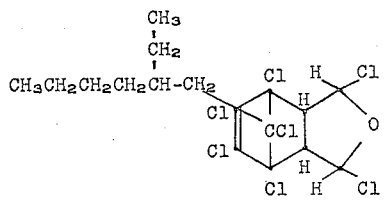

*Example 4*

The process of Example 1 was repeated using the adduct of dihydrofuran and 1,2,3,4-tetrachloro-5,5-dimethylcyclopentadiene. The product, $n_{25}^D$ 1.5578 was found to have the structure

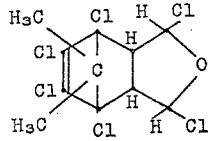

*Example 5*

The bromination of the adduct of 1,2,3,4-tetrachloro-5,5-dimethylcyclopentadiene and dihydrothiophene in the presence of benzoyl peroxide produced a compound of the structure

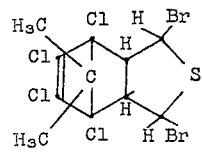

*Example 6*

The Diels-Alder adduct of dihydrofuran and 1,2,3,4,5-pentachloro-5-isopropylcyclopentadiene was produced and dissolved in 150 ml. of carbon tetrachloride. Five grams of chlorine were introduced while irradiating the reaction vessel with bright ultraviolet light. The product recovered in 78% yield ($n_{25}^D$=1.5628) was found to have the structure

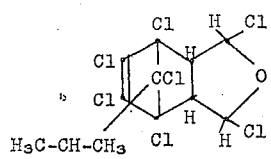

*Example 7*

The procedure of Example 6 was repeated except that the cyclopentadiene was replaced by 1,2,3,4,5-pentabromo-5-methylcyclopentadiene and the dihydrofuran by dihydrothiophene. The product has the structure

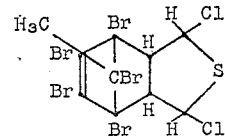

*Example 8*

The procedure of Exampe 2 was repeated except that the 1,2,3,4,5-pentabromo-5-methylcyclopentadiene was used in in place of the 1,2,3,4,5-pentachloro-5-methylcyclopentadiene. The compound produced had the structure

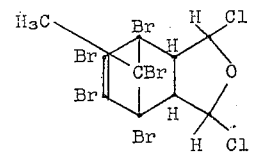

*Example 9*

The procedure of Example 4 was repeated except that approximately half of the amount of chlorine was used. A compound separated from the reaction mixture with the structure

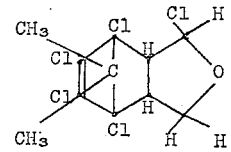

*Example 10*

An adduct of dihydrothiophene and 1,2,3,4-tetrachloro-5-(3-methoxypropyl)cyclopentadiene is treated with one molar proportion of bromine to form a compound of the structure

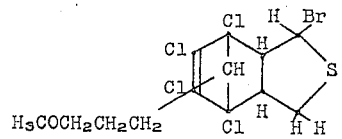

*Example 11*

The procedure of Example 1 was repeated except that the adduct of 5(2-chloroethyl)-1,2,3,4,5-pentachlorocyclopentadiene and 2,5-dihydrofuran was chlorinated in the presence of ultraviolet light. The reaction product was obtained in essentially quantitative yield in the form of a pale yellow oil, having $n_D^{25}$ 1.5674 and the structure

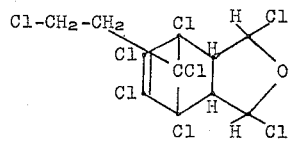

*Example 12*

The procedure of Example 1 was repeated except that the adduct of 5,5-diethyl-1,2,3,4-tetrachlorocyclopentadiene was used in place of the 5-monoethyl analog. The resultant product had $n_D^{25}$ 1.5582 and the structure

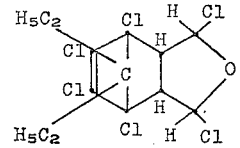

Since the new compounds are useful as insecticides, bactericides, nematocides and herbicides, they may be formulated as required for the intended use. Compositions of the active component and various adjuvants may be used in various physical forms, for example solutions, dispersions or as pulverulent formulations. They may be prepared as concentrates for dilution prior to use, or as dilute dispersions or solutions for immediate use. The preparation of aqueous formulations may take place just prior to use by dispersing in the available water to the extent desired. Since concentrated dispersions may exceed the water solubility of the active component, it is frequently desirable to avoid local excesses of active components by providing agents which assure the complete and uniform dispersion of the formulation components. Suitable agents are the surface active agents, which may be cationic, anionic, nonionic or those which possess both cationic and anionic properties.

The surfactants may contain both hydrophilic and hydrophobic functions, and thereby are in part attracted to water and still have water repellant properties. The oil-soluble components are attracted by one function which is water repellant and in this manner, local concentrations of the formulation components are avoided. Examples of the surface active agents include conventional soaps, such as the water-soluble salts of long chain carboxylic acids, the amine soaps, such as the amine salts of long chain carboxylic acids, the sulfonated animal, vegetable and mineral oils, quaternary salts of high molecular weight acids, resin soaps such as salts of abietic acid, sulfuric acid salts of high molecular weight organic compounds, algin soaps, ethylene oxide condensated with fatty acid, alkyl phenols and mercaptans, and other simple and polymeric compositions having both hydrophilic and hydrophobic functions so as to enable the mixing of otherwise immiscible ingredients. Other examples are described in detail in the textbook "Surface Active Agents and Detergents," Schwartz, Perry and Berch (Interscience Publishers Inc., New York, 1958).

The above-described surfactants are particularly useful in aqueous formulations which have a heterogeneous component that must be maintained in dispersed condition. The heterogeneous component may be a water-immiscible organic solvent which will aid in the dissolution of the water-insoluble excess of active component or other extraneous or collateral component of the formulation. The organic solvent may be present in the amount of 0.05 to 10 percent by weight of the final formulation, depending upon the quantity of undissolved substance present. The conventional liquid formulation will usually have from 0.5 to 2 percent of the organic solvent. Suitable organic solvents for the active components are the water-immiscible organic alcohols, ketones and hydrocarbons, for example isopropanol, benzene, acetone, methyl ethyl ketone, kerosene, and chlorinated hydrocarbons. The proportions of such organic liquid additives will depend upon the solubility properties of the active ingredient and may require as little as 1 percent or as much as 20 percent in order to provide a uniform distribution within the formulation, which is capable of maintaining its distributed state during storage, use and after application to the soil or plant surfaces.

Aqueous formulations may contain solid substances when the formulation is prepared by adding a wettable dust to water. In order to suspend the larger quantity of water insoluble solids more of the surfactant is usually required, for example 1.0 to 10 percent. The solid component of the wettable powders, in addition to providing a carrier for the concentrates, will serve as an indicator in the final formulation to permit the visual estimation of the area and the weight of coverage. Solid substances will retain the active component by occlusion and will often have better adhesion to the foliage being treated for chemotherapeutic or herbicidal use. The solid carriers for use in solid pulverulent compositions, either as concentrates or as treating formulations contain surfactants to prevent local high concentrations, and to facilitate distribution on the infested environment. Suitable solid diluents are those which render the compositions permanently dry and free flowing. Thus, hygroscopic materials are to be avoided unless the compositions also contain a separate substance to serve as an aid to the flowability. Effective solid diluents, preferably pulverulent or granular in form so as to be effective carriers for the active ingredient, are the natural clays, such as china clays, the bentonites and the attapulgites; other minerals in natural state such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 98 percent by weight of the entire formulation as applied to the soil or to plant surfaces.

Other adjuvants having specific activity in the control of certain insects, fungus, bacteria, mites or objectionable plants may be added to increase the spectrum of utility. These may be any additives known to be useful toxicants, and especially for the control of plant and animal species which have a measure of resistance to the principal toxicant.

Although the invention is described with respect to the above explicit examples, it is not intended that the details thereof are limitations on the scope of the invention except to the extent incorporated in the following claims.

What is claimed is:

1. A compound of the structure

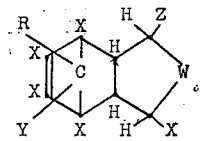

wherein the X symbols represent atoms selected from the class consisting of chlorine and bromine; wherein W is an atom selected from the class consisting of oxygen and sulfur; wherein R is selected from the class consisting of alkyl radicals of up to 12 carbon atoms; and said alkyl radicals having substituents of the class consisting of phenyl, alkyloxy having up to four carbon atoms, and chlorine; wherein Z is selected from the class consisting of X and hydrogen; and wherein Y is selected from the class consisting of R, X and hydrogen.

2. A compound of the structure

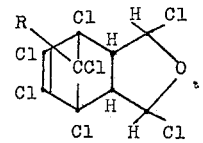

wherein R is an alkyl having from one to 12 carbon atoms.

3. A compound of the structure

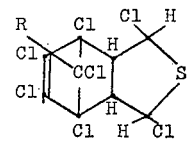

wherein R is an alkyl having from one to 12 carbon atoms.

4. A compound of the structure

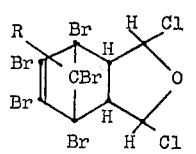

wherein R is an alkyl having from one to 12 carbon atoms.

5. A compound of the structure

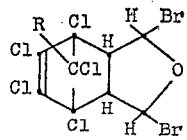

wherein R is an alkyl having from one to 12 carbon atoms.

6. A compound of the structure

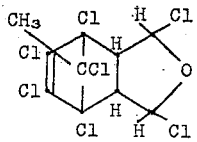

7. A compound of the structure

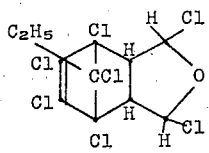

8. A compound of the structure

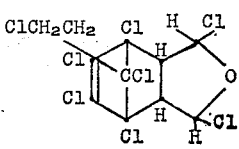

9. A compound of the structure

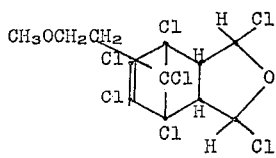

10. A compound of the structure

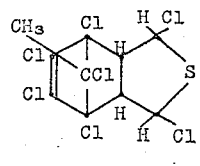

References Cited by the Examiner
UNITED STATES PATENTS

| | | |
|---|---|---|
| 2,879,275 | 3/1959 | Feichtinger et al. __ 260—346.2 |
| 2,881,187 | 4/1959 | Feichtinger et al. __ 260—346.2 |
| 2,974,084 | 3/1961 | Mayhew et al. _____ 167—33 |
| 2,989,435 | 6/1961 | Walop et al. _____ 167—33 |

NICHOLAS S. RIZZO, *Primary Examiner.*

HENRY R. JILES, *Assistant Examiner.*